United States Patent [19]

Borderie

[11] 3,930,354
[45] Jan. 6, 1976

[54] HARVESTING DEVICE IN PARTICULAR FOR AN ENSILAGING MACHINE

[75] Inventor: Antoine Borderie, Argenteuil, France

[73] Assignee: Societe Rivierre-Casalis, Fleury Les Aubrais, France

[22] Filed: Feb. 26, 1974

[21] Appl. No.: 446,109

[30] Foreign Application Priority Data
Mar. 2, 1973 France .................... 73.7307548

[52] U.S. Cl. .................................................. 56/94
[51] Int. Cl.² ........................................ A01D 45/02
[58] Field of Search .......... 56/94, 61, 98, 102, 14.1, 56/14.2

[56] References Cited
UNITED STATES PATENTS

| | | | |
|---|---|---|---|
| 322,459 | 7/1885 | Lewis et al. | 56/98 |
| 1,239,685 | 9/1917 | Gruben | 56/98 |
| 2,009,784 | 7/1935 | Palmer | 56/102 |
| 3,075,339 | 1/1963 | Barkstrom | 56/98 |
| 3,654,752 | 4/1972 | Segredo | 56/98 |

*Primary Examiner*—Russell R. Kinsey
*Attorney, Agent, or Firm*—Wenderoth, Lind & Ponack

[57] ABSTRACT

The device comprises at least one gatherer having two dividers and two advancing devices in the dividers for advancing severed stalks which have been severed by a cutting mechanism. Each advancing device comprises a front shaft and a rear shaft, the front shafts being parallel and upwardly and forwardly inclined and each carrying a rotary cutter adjacent the lower end of the shaft, a chain sprocket wheel and a rotary member fixed to the shaft adjacent the upper end of the shaft. An endless chain of each advancing device extends around the corresponding sprocket wheel. The rotary cutters are contained in the same plane and rotate in opposite directions. The rotary members co-operate with each other for seizing successive stalks before the stalks are severed and directing the stalks in a passageway defined by the dividers.

22 Claims, 5 Drawing Figures

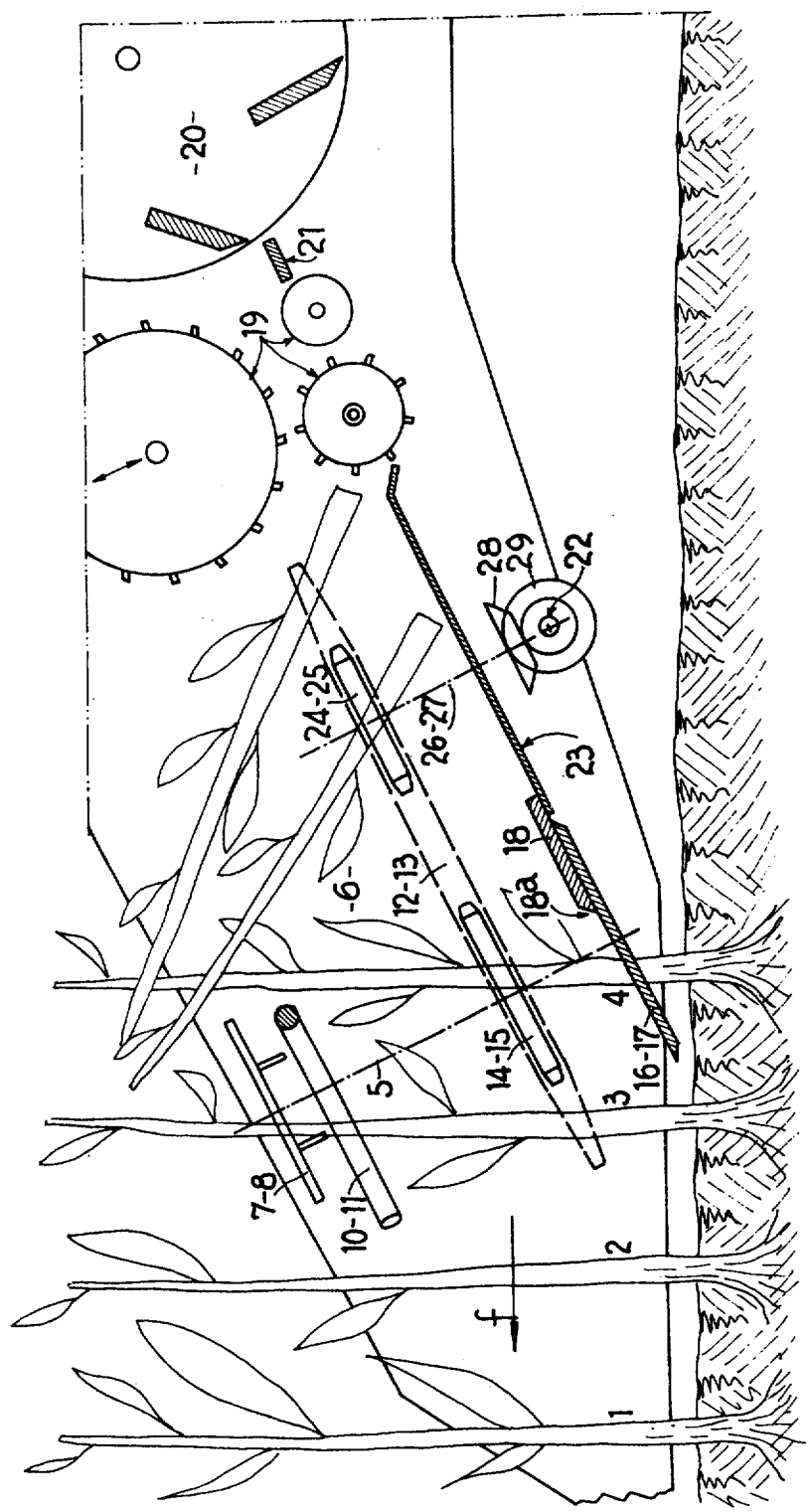
FIG_2

HARVESTING DEVICE IN PARTICULAR FOR AN ENSILAGING MACHINE

BACKGROUND OF THE INVENTION

The present invention relates to devices for harvesting plant stems sown in rows, in particular for a corn or maize ensilaging machine, in which at least one gatherer having two dividers comprises a cutting mechanism and two advancing devices provided in the respective dividers for the transfer of the cut stalks to a treating apparatus, the advancing devices comprising two parallel shafts which are forwardly and upwardly inclined, the respective front shafts of the advancing devices carrying at their lower end two rotary cutters contained in the same plane and rotating in opposite directions. The treating apparatus may be a thresher for shelling or a cutting rotor for chopping the harvest for a subsequent ensilage.

A device of this type, described in U.S. Pat. No. 1,600,836, has the drawback that the cutters have a horizontal disposition and consequently require a drive through universal joints. Moreover, it imperfectly holds the severed stalks in the course of their transfer so that certain stalks are not taken up in the machine and are abandoned on the ground.

SUMMARY OF THE INVENTION

An object of the invention is to provide a harvester which overcomes the drawbacks of the known device.

The invention provides a harvesting device, wherein the front shaft of each advancing device carries a sprocket wheel around which extends an endless chain of the advancing device and there are fixed on the upper end of the respective front shafts two rotary members each of which is coaxial with the corresponding sprocket wheel and rotary cutter, the rotary members co-operating with each other for seizing the successive stalks before the severing thereof so as to conduct them into the feedway defined between the two dividers.

Owing to the coaxial disposition of the moving cutters relative to the shafts, the latter directly drive the cutters. As concerns the holding of the stalks, this is achieved by the complementary arrangement in which there are fixed in the upper part of the respective front shafts two rotary members which cooperate with each other and constitute a turnstile which seizes the stalk before the severing thereof so as to advance it into the feedway between the two dividers.

In order to prevent any rearward movement of the stalk at the output end of the turnstile, each one of the rotary members of the latter is combined with a movable or deformable stop element, preferably constructed in the form of an arm pivoted to a spring, to retain the upper part of the stalk.

The front shaft on which there are fixed one of the cutters and one of the rotary members of the turnstile, is advantageously driven by the corresponding sprocket wheel which is itself secured to the shaft, the rear sprocket wheel of the chain being integral with the shaft driven by the driving system of the harvester which also drives the treating apparatus such as a thresher or chopper.

BRIEF DESCRIPTION OF THE DRAWINGS

Further features and advantages of the invention will be apparent from the ensuing description with reference to the accompanying drawings.

In the drawings:

FIG. 2 is a schematic longitudinal sectional view of the harvesting device in the region of the passageway defined between the two dividers of the gatherer showing the manner in which the device acts on the stalks to be severed and driven along;

DETAILED DESCRIPTION OF THE INVENTION

Figure 1:
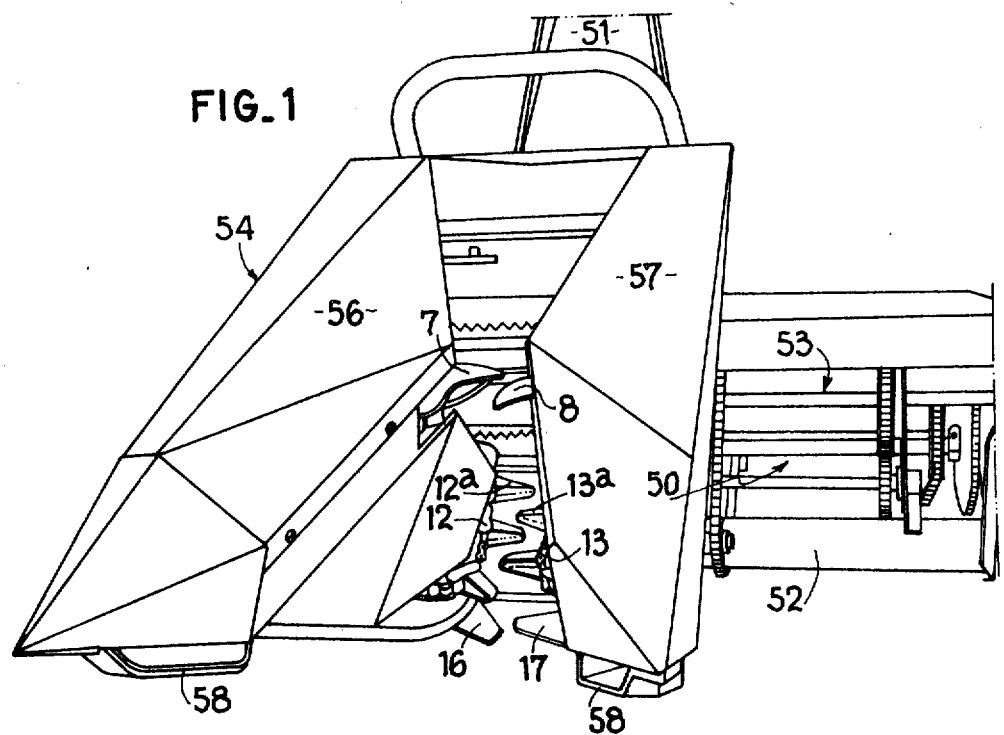
FIG. 1 is a perspective view of a corn or maize ensilaging machine equipped with a harvesting device according to the invention.
Figure 4:
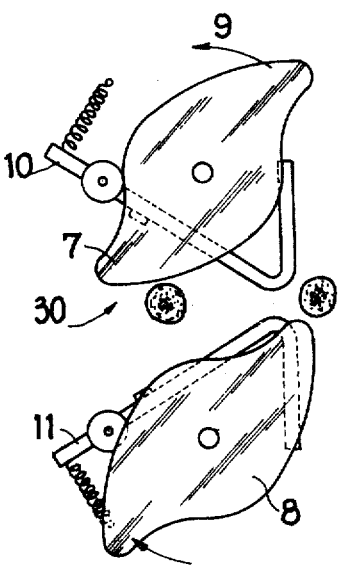
FIGS. 4 and 5 are diagrammatic views of two successive positions of the turnstile and of the stalks which pass therethrough.
Figure 5:
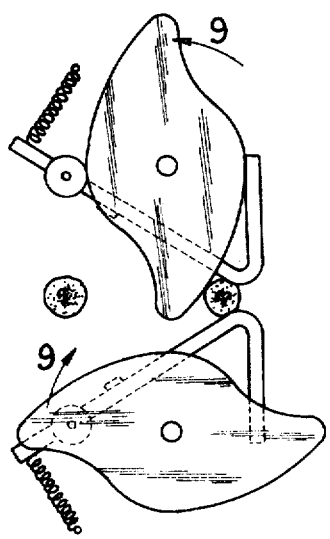
Figure 3:
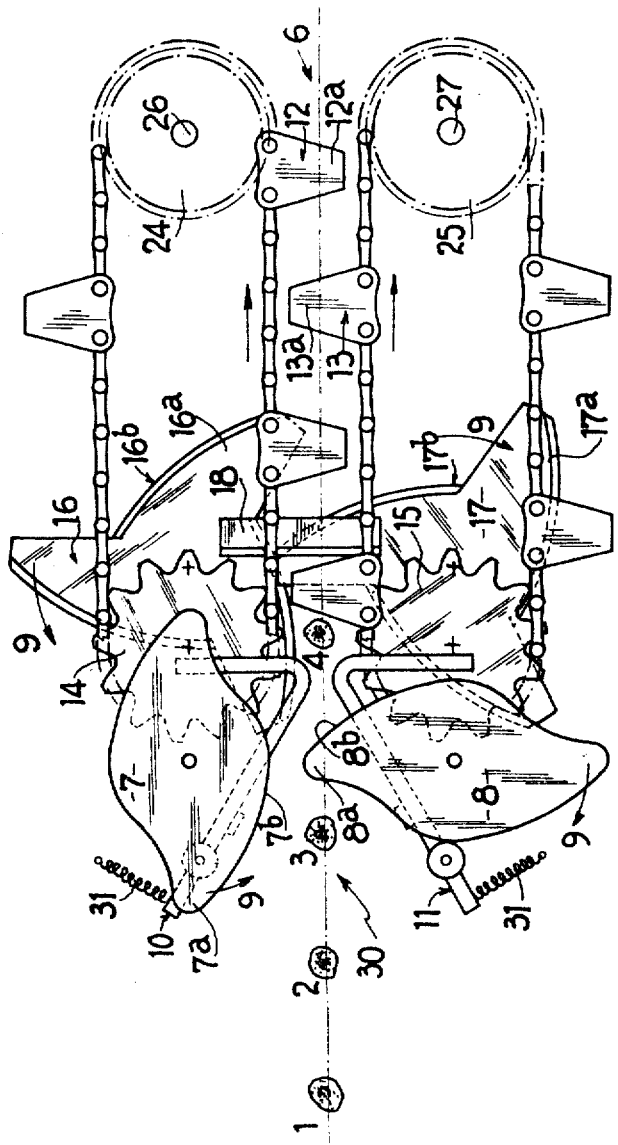
FIG. 3 is a corresponding diagrammatic plan view.

The ensilaging machine shown in FIG. 1, which travels in the direction of arrow $f$ of FIG. 2, comprises a supporting chassis 50 to the rear of which there is fixed the discharging spout 51, the chassis bearing on the ground through wheels (not shown) mounted at the ends of the main tubular cross member 52 above which there are disposed the mechanical actuating elements 53 driven by the power take-off of the tractor and driving the cutting rotor 20 of the chopper, the advancing rollers 19 and the shaft 22 which drives the moving elements of the harvesting device 54 fixed in the front of the chassis 50 (FIGS. 1 and 2).

The harvesting device 54 which encounters the stalks 1, 2, 3, 4 to be harvested constitutes a gatherer whose frame comprises mainly two dividers 56, 57 which are capable of bearing on the ground through shoes 58 and which are interconnected by an inclined sheet 23 forming the bottom of the feedway or passageway 6 defined between the dividers 56,57. On the lower part of the sheet 23, there is fixed a blade 18 constituting a counter-cutter whose cutting edge 18a cooperates with two rotary cutters 16, 17 respectively fixed on one and the other of two shafts 5 (shown schematically in FIG. 2) which are perpendicular to the bottom sheet 23 and journalled in bearings carried in the front portions of the dividers 56, 57. Each of the shafts 5 is driven by a sprocket wheel 14 or 15 which is keyed on the shaft and around which extends a chain 12 or 13 (shown schematically in FIG. 2) which is driven by a sprocket wheel 24 or 25 fixed on a shaft 26 or 27 (shown schematically in FIG. 2) which is parallel to the shaft 5 and whose lower end carries a bevel gear 28 meshed with a corresponding bevel gear 29 keyed on the drive shaft 22.

The rotary cutters 16, 17, which are synchronized with each other, are rotated in opposite directions and operate in co-operation with the fixed blade 18. The illustrated cutters each comprise three blades or branches 16a, 17a, with cutting edges 16b, 17b, which are each located during the course of rotation in one of three recesses of the other cutter. The cutters may have a different number of branches to ensure the required efficiency in accordance with the speed of travel of the machine and of the density of the harvest. The shape and inclination of the cutters and fixed blade 18 promote the picking up of the stalks which may, as the case may be, slope to one side or in front of the machine, and thus permits the introduction of the stalks into the passageway 6 defined on the axis of symmetry of the gatherer.

The two gathering chains 12 and 13 which drive the shafts 5 carrying the cutters 16, 17 and which are engaged with the sprocket wheels 14 and 15 are conventional roller chains provided with lateral projections or nose members 12a, 13a arranged along each chain at an even spacing, so that the nose member of one chain is disposed between two consecutive nose members of the other chain, and define therebetween a space which is sufficient to allow passage therethrough of at least one stalk of the harvested plants.

Secured to the upper part of each shaft 5 is a rotary member 7 or 8 having two projections or branches 7a, 8a, these two rotary members together constituting a turnstile 30 and each having two operative edges 7b, 8b of convex shape arranged to act on the stalks before they are severed by the cutters. The operative edges of one of the rotary members are angularly offset with respect to the operative edges of the other rotary member so that the stalks are acted upon alternately by one and then the other of the rotary members 7, 8.

The rotary members 7, 8 of the turntile 30 rotate at the same speed of rotation as the shaft 5 but have a number of branches which is less than the number of branches of the cutters 16, 17 (two instead of three in the illustrated embodiment) so that the lower frequency of passage of the branches of the turnstile impart a speed of displacement of the upper part of the stalks which is lower than the speed of displacement of the lower part of the stalks driven by the chains 12, 13. Associated with these rotary members are two pivotable stop members 10, 11 which are mounted on the frame of the apparatus and are each biased by a spring 31 and ensure that, before or after their severing, the stalks do not fall forwardly of the machine and which support the stalks during the time that their lower part is being moved by the chains 12, 13 and their nose members 12a, 13a, toward the stalk advancing or feeding rollers 19.

Owing to the angular disposition with respect to the vertical of the shafts 5, there occurs in succession:

introduction and holding in the passageway 6 of the gatherer of the upper part of the stalks by, on one hand, the turnstile 30 located on the upper parts of the shafts 5 rotating in the direction of the arrows 9 and, on the other hand, the pivotable spring-biased stop members 10 and 11 which retain the stalks which have passed through the turnstile;

beginning of the driving of the upper part of the stalks by the chains 12, 13;

severing of the lower part of the stalks by the rotary cutters 16 and 17 which operate against the fixed blade 18;

transfer of the severed stalks to the working means such as, in the drawings, the advancing rollers 19, the cutting rotor 20 and its fixed cutter 21.

Whereas in the illustrated embodiment the sprocket wheels 14, 15, around which extend the respective chains, are keyed on the shafts 5, it is possible to provide a freely rotatable mounting of the sprocket wheels 14, 15 and to drive the shafts 5 by means independent of the chains.

Having now described my invention what I claim as new and desire to secure by Letters Patent is:

1. In a harvesting device, particularly for use with a corn ensilaging machine, said device including a treating apparatus; at least one gatherer device formed by a pair of spaced dividers providing therebetween a passageway; a cutting mechanism for severing planted stalks in said passageway; and a pair of advancing devices, one in each of said dividers, for transferring severed stalks to said treating apparatus; the improvement wherein:

each said advancing device comprising a first rear shaft and a second front shaft, said front shaft being forwardly and upwardly inclined relative to the direction of movement of said harvesting device, the front shafts of said pair of advancing devices being parallel, a sprocket wheel mounted on each said front and rear shaft, and an endless chain extending around the sprocket wheels on said front and rear shafts;

said cutting mechanism comprising a pair of rotary cutters, one each fixed to the lower end of one of said front shafts, said pair of rotary cutters being contained in the same plane and being rotatable in opposite directions;

said improvement further comprising:

a pair of rotary members, one each fixed to the upper end of one of said front shafts, said pair of rotary members cooperating to form means for seizing stalks before said stalks are severed by said rotary cutters and directing said stalks into said passageway; and a pair of stop elements, one each positioned adjacent one of said rotary members, said pair of stop elements cooperating to form means for retaining the upper part of each stalk after the passage thereof through said rotary members and preventing the stalk from falling forwardly of said harvesting device.

2. The improvement claimed in claim 1, wherein each said stop element is movable relative to the harvesting device.

3. The improvement claimed in claim 1, wherein each said stop element is deformable.

4. The improvement claimed in claim 1, wherein each said stop element is a spring-biased pivotable arm.

5. The improvement claimed in claim 1, wherein said cutting mechanism further comprises a common fixed blade positioned across said passageway and co-operable with said rotary cutters.

6. The improvement claimed in claim 1, wherein said rotary members comprise means for moving the upper end of the stalks at a speed of displacement which is lower than that undergone by the lower end of the stalks under the action of said endless chains.

7. The improvement claimed in claim 1, wherein each said rotary member comprises at least one operative edge means, which is angularly offset with respect to a corresponding operative edge of the other said rotary member, for seizing and conveying the upper ends of stalks.

8. The improvement claimed in claim 1, wherein each said rotary member has a plurality of projections each of which defines an operative edge means for seizing and conveying the upper ends of stalks.

9. The improvement claimed in claim 5, wherein each said rotary cutter comprises at least one cutting edge which is angularly offset with respect to a corresponding cutting edge of the other said rotary cutter, whereby said fixed blade is engaged alternately first by one rotary cutter and then by the other rotary cutter.

10. The improvement claimed in claim 1, wherein each said rotary cutter has a plurality of equally spaced blades, each of which are disposed relative to the blades of the other said rotary cutter in the manner of the teeth of a gear wheel.

11. The improvement claimed in claim 8, wherein each said rotary cutter has a plurality of blades each having a cutting edge, the number of projections of each said rotary member being less than the number of blades of the corresponding said rotary cutter.

12. The improvement claimed in claim 1, wherein the chain sprocket wheel mounted on each front shaft is fixedly keyed thereto.

13. The improvement claimed in claim 1, wherein said two endless chains are contained in the same plane.

14. The improvement claimed in claim 1, wherein each said endless chain has thereon evenly spaced apart lateral projections, the lateral projections of one of said endless chains being in alternating relation to the lateral projections of the other said endless chain.

15. In a harvesting device, particularly for use with a corn ensilaging machine, said device including a treating apparatus; at least one gatherer device formed by a pair of spaced dividers providing therebetween a passageway; a cutting mechanism for severing planted stalks in said passageway; and a pair of advancing devices, one in each of said dividers, for transferring severed stalks to said treating apparatus; the improvement wherein:
  each said advancing device comprising a first rear shaft and a second front shaft, said front shaft being forwardly and upwardly inclined relative to the direction of movement of said harvesting device, the front shafts of said pair of advancing devices being parallel, a sprocket wheel mounted on each said front and rear shaft, and an endless chain extending around the sprocket wheels on said front and rear shafts;
  said cutting mechanism comprising a pair of rotary cutters, one each fixed to the lower end of one of said front shafts, said pair of rotary cutters being contained in the same plane and being rotatable in opposite directions, each said rotary cutter having a plurality of blades each having a cutting edge;
  said improvement further comprising:
  a pair of rotary members, one each fixed to the upper end of one of said front shafts, said pair of rotary members cooperating to form means for seizing stalks before said stalks are severed by said rotary cutters and directing said stalks into said passageway, each said rotary member having a plurality of projections each of which defines an operative edge means for seizing and conveying the upper ends of stalks, the number of projections of each said rotary member being less than the number of blades of the corresponding said rotary cutter.

16. The improvement claimed in claim 15, wherein said cutting mechanism further comprises a common fixed blade positioned across said passageway and cooperable with said rotary cutters.

17. The improvement claimed in claim 15, wherein said projections of each said rotary member are offset with respect to the corresponding projections of the other said rotary member.

18. The improvement claimed in claim 16, wherein said cutting edges of each said rotary cutter are angularly offset with respect to the corresponding cutting edges of the other said rotary cutter.

19. The improvement claimed in claim 15, wherein each said rotary cutter has a plurality of blades each having a cutting edge, the number of projections of each said rotary member being less than the number of blades of the corresponding said rotary cutter.

20. The improvement claimed in claim 15, wherein the chain sprocket wheel mounted on each front shaft is fixedly keyed thereto.

21. The improvement claimed in claim 15, wherein said two endless chains are contained in the same plane.

22. The improvement claimed in claim 15, wherein each said endless chain has thereon evenly spaced apart lateral projections, the lateral projections of one of said endless chains being in alternating relation to the lateral projections of the other said endless chain.

* * * * *